(12) United States Patent
Merth et al.

(10) Patent No.: US 9,010,481 B2
(45) Date of Patent: Apr. 21, 2015

(54) SELF-CONTAINED TRUCK MOUNTABLE HYDRAULIC PUMPING ARRANGEMENT

(75) Inventors: Jeffrey M. Merth, Oakdale, MN (US); Shawn Auxier, Madison, IN (US)

(73) Assignee: Stac, Inc., St. Paul, MN (US)

( * ) Notice: Subject to any disclaimer, the term of this patent is extended or adjusted under 35 U.S.C. 154(b) by 860 days.

(21) Appl. No.: 12/948,640

(22) Filed: Nov. 17, 2010

(65) Prior Publication Data

US 2011/0114411 A1    May 19, 2011

Related U.S. Application Data

(60) Provisional application No. 61/261,858, filed on Nov. 17, 2009.

(51) Int. Cl.
| | | |
|---|---|---|
| *B62D 21/00* | (2006.01) | |
| *F16K 49/00* | (2006.01) | |
| *F16L 53/00* | (2006.01) | |
| *B60P 3/22* | (2006.01) | |
| *F04B 17/05* | (2006.01) | |

(52) U.S. Cl.
CPC ........... *F04B 17/05* (2013.01); *Y10T 29/49236* (2013.01); *B60P 3/2245* (2013.01)

(58) Field of Classification Search
USPC .................. 180/311, 312; 137/340, 267, 899, 137/899.4; 62/236, 323.1, 323.2, 323.3; 165/51, 52
See application file for complete search history.

(56) References Cited

U.S. PATENT DOCUMENTS

| | | | | |
|---|---|---|---|---|
| 4,177,017 | A | * | 12/1979 | Schultz .......................... 417/231 |
| 5,222,875 | A | * | 6/1993 | Clark .............................. 417/390 |
| 5,954,101 | A | * | 9/1999 | Drube et al. ..................... 141/82 |
| 5,975,162 | A | | 11/1999 | Link, Jr. |
| 6,216,719 | B1 | | 4/2001 | Meyer |
| 6,334,464 | B1 | | 1/2002 | LaMotte |
| 6,688,328 | B2 | * | 2/2004 | Van Wie ........................ 137/376 |
| 6,732,791 | B2 | | 5/2004 | Buysse et al. |
| 6,756,693 | B2 | * | 6/2004 | Kennedy ........................ 290/1 A |
| RE39,249 | E | | 8/2006 | Link, Jr. |
| 7,237,636 | B2 | * | 7/2007 | Ruppert et al. ............. 180/89.17 |
| 7,391,129 | B2 | | 6/2008 | Chiao et al. |
| 7,721,557 | B1 | | 5/2010 | Stearns |
| 8,365,855 | B2 | * | 2/2013 | Mamada et al. .............. 180/68.1 |
| 2005/0016713 | A1 | * | 1/2005 | Houck et al. .................... 165/42 |
| 2007/0131466 | A1 | * | 6/2007 | Gutzwiller et al. ........... 180/89.1 |
| 2009/0084621 | A1 | * | 4/2009 | Giovannini et al. .......... 180/89.1 |

OTHER PUBLICATIONS

Lotus Equipment Sales Ltd., Kohler Propane/Natural Gas Engines, downloaded on the internet from www.lotus-equip.com on Nov. 5, 2009.

\* cited by examiner

*Primary Examiner* — Paul N Dickson
*Assistant Examiner* — Joselynn Y Sliteris
(74) *Attorney, Agent, or Firm* — Shewchuk IP Services, LLC; Jeffrey D. Shewchuk

(57) ABSTRACT

Separate from the vehicle's engine, a self-contained internal combustion engine supplies hydraulic power to drive a product pump on a bobtail. The self-contained engine, which can itself run on propane, is provided as part of a preassembly which includes the hydraulic pump, the hydraulic fluid tank, a heat exchanger, and a solenoid controlled start-up valve. The preassembly is mounted as a unit to the side of the bobtail in front of the rear wheels, powering the product pump at the rear of the bobtail while the vehicle's engine is off.

17 Claims, 4 Drawing Sheets

SELF-CONTAINED TRUCK MOUNTABLE HYDRAULIC PUMPING ARRANGEMENT

CROSS-REFERENCE TO RELATED APPLICATION(S)

The present application claims priority from U.S. Provisional Application No. 61/261,858 entitled SELF-CONTAINED TRUCK MOUNTABLE HYDRAULIC PUMPING ARRANGEMENT, filed Nov. 17, 2009, incorporated herein by reference.

BACKGROUND OF THE INVENTION

The present invention relates to pumping systems for delivering fluid from vehicle-carried tanks, such as pumping systems for delivering liquid propane (or, more commonly and specifically, liquid petroleum gas ("LPG"), and the term "propane" as used herein includes LPG and similar fuels containing propane) from a bobtail truck. Liquefied compressed gases such as propane are commonly transported in a tank called a "bottle" carried on a truck known as a "bobtail". Bottles typically have a capacity of about 2,600 to 3,000 gallons, though some bobtails can include a bottle up to about 5,000 gallons.

The bobtail delivery/distribution of propane is a significant portion of the product cost, and bobtail delivery of propane needs to be made as efficient as possible. Because both bobtail trucks and driver time are expensive, it is important to manage the bobtail fleet as efficiently as possible, and thereby deliver as much propane as quickly as possible, with as few trucks as possible. For best utilization of the bobtail fleet, the bobtail trucks must be extremely reliable. Maintenance of the fleet to effectively eliminate downtime is critical. As delivery schedules get tighter and tighter, delays or difficulty in delivering propane not only significantly reduces profitability of the fleet, but also angers customers. At present, bobtail drivers can average 24 stops each shift, to deliver up to two full bottles or more—averaging about 4,800 gallons—per shift, for a total average delivery of 450,000 or more gallons per bobtail per year. Some bobtails may deliver 1.3 million gallons or more in a single year.

A typical bobtail weighs around 33,000 pounds when fully loaded, and is carrying about 17,000 pounds due to the weight of the bottle after the propane has been delivered. The bobtail trucks need to be rugged and robust, withstanding the heavy loads. Over the last few decades, heavier duty, diesel powered, class 7 trucks have replaced lighter, gasoline powered engines.

One of the ways in which bobtail performance affects delivery times is in how long it takes to pump propane out of the bottle and into a customer's tank, often called a "pig". Bobtail trucks typically include a product pump which is used to maintain pressure and move propane from the bobtail's bottle into the customer's pig. In some cases, the product pump is powered directly from a power take off or PTO on the engine/transmission of the bobtail, which involves a mechanical transfer (typically a rotating shaft) from the PTO to the product pump which is typically located on the front bottom of the bottle, with a delivery pipe extending from the product pump to a delivery hose on the rear of the vehicle. In other cases, the product pump is located on the back of the bobtail, and power is delivered from the PTO on the bobtail engine/transmission to the product pump using a hydraulic fluid. Hydraulic systems can be quieter than mechanically powering the product pump off the PTO, and have been found to be very reliable. Delivery speeds and pump times using hydraulic systems have been good, and pump life also appears to be good. Additionally, once the hydraulic system is in place, hydraulics can be used for more than just the product pump. For instance, product hose reels could be operated hydraulically, and the remote shutdown system can be incorporated into the hydraulics.

One way to improve the performance of the hydraulic power and product pump is to use the Hydraulic Oil Cooler Supplying Vessel Pressure Stabilizer system as disclosed in U.S. Pat. No. 6,732,791. The arrangement disclosed in U.S. Pat. No. 6,732,791 provides numerous benefits in pumping fluid from a vehicle-carried tank. This system includes a liquid-to-liquid heat exchanger which cools the hydraulic fluid using a small return (approximately 2 gpm) of product to the bottle. The heated propane return to the bottle increases product pump flow rates, reduces cavitation and increases product pump life. The preferred system also eliminates the need for a fan to cool the hydraulic oil. In this prior art arrangement, the ultimate power source driving the fluid is the engine of the vehicle. A PTO draws power from the vehicle engine to drive the hydraulic side of the arrangement. The hydraulic power is then used to drive the main discharge pump for the bottle. The present invention is particularly contemplated as an improvement to U.S. Pat. No. 6,732,791, assigned to the assignee of the present invention and incorporated by reference.

At the same time as reliability is paramount, longevity of each truck is also very important for profitability. A bottle can be used for 30 years or more—typically two to three times longer than the life of the bobtail itself. Thus bottles need to be able to be switched between bobtail trucks as efficiently and easily as possible. The bobtail trucks themselves might log 200,000 to 300,000 miles over an average 12 year lifespan. In the same way as saving a few cents per bobtail at each delivery location can add up to millions of dollars in savings for the entire fleet, adding a few years or few thousand miles to the lifespan of each bobtail can also add up to millions of dollars in savings for the entire fleet. More ways to save are needed.

SUMMARY OF THE INVENTION

The present invention involves the realization that use of the PTO during pumping of product, and the commensurately longer idle run time of the engine, can be avoided. A self-contained internal combustion engine is used to supply hydraulic power to a hydraulic motor on the product pump, and the self-contained internal combustion engine can be run while the bobtail's engine is off. The self-contained internal combustion engine is provided as part of a preassembly such as within a housing that contains the hydraulic pump and preferably a hydraulic fluid tank and a heat exchanger for the hydraulic fluid. The preassembly can also include a start-up valve controlled by a solenoid, which in turn allows remotely turning off the hydraulic pressure to the hydraulic motor/product pump. The preassembly can be conveniently mounted as a unit to the side of the bobtail in front of the rear wheels.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
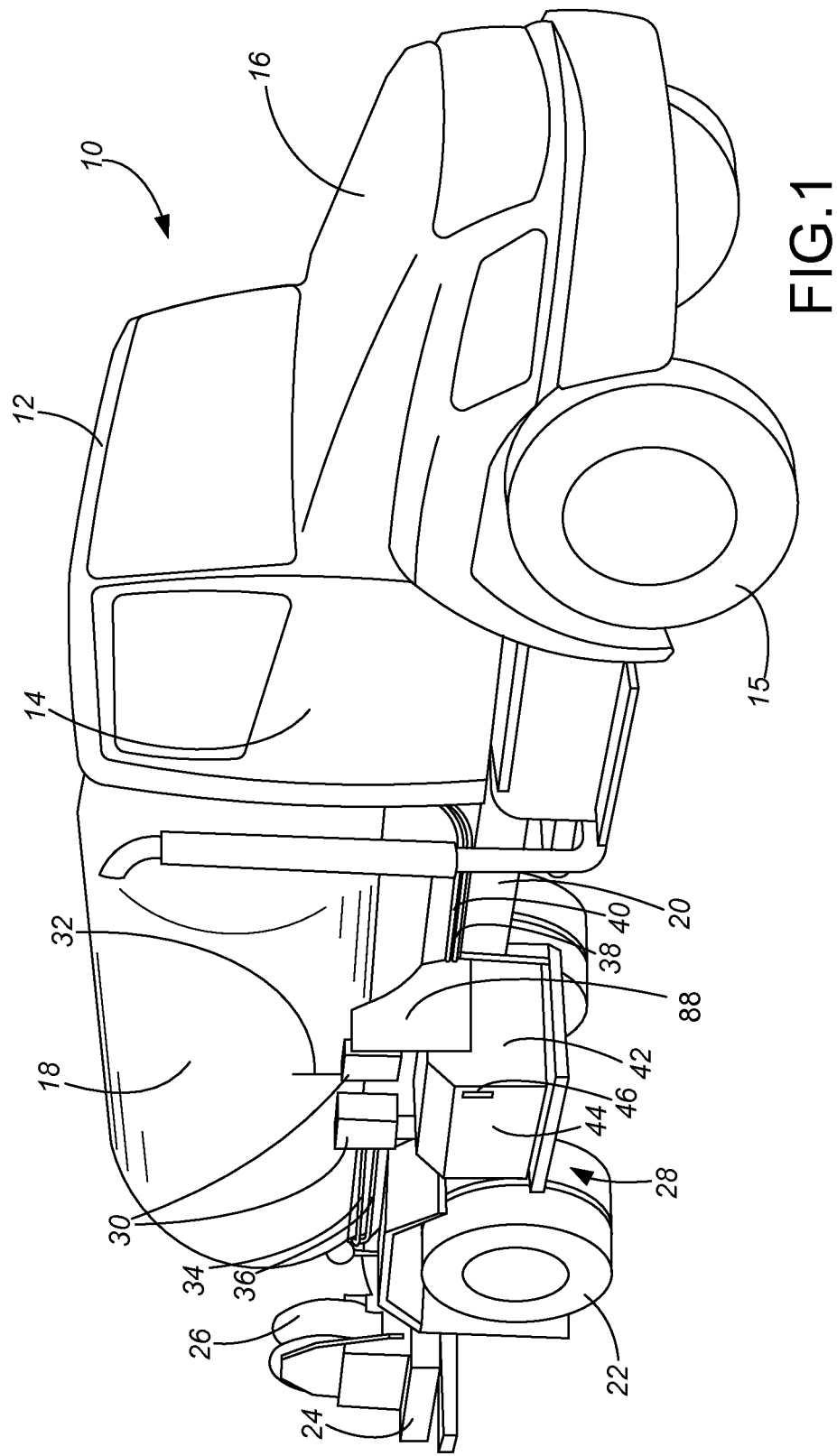
FIG. 1 is a perspective view of a bobtail truck showing the preferred self-contained truck mountable hydraulic pumping arrangement of the present invention.

FIG. 1 generally shows a typical bobtail truck 10 for use with the present invention. As examples, bobtails (or trucks suitable for bobtail use) such as this are manufactured by Kenworth (T300), Sterling (Acterra), International, Peterbuilt, Freightliner and Western Star. The bobtail 10 includes a cab 12 for the driver, with a passenger door 14 just behind a front wheel 15. The bobtail 10 has a hood 16, and an engine (not separately shown) for the bobtail 10 is under the hood 16. Typically the bobtail 10 is considered a class 7 truck for on-highway travel at highway speeds, and the engine is a diesel engine, such as a Caterpillar C7 230 horsepower engine.

The bottle 18 of the bobtail 10 is carried behind the cab 12 on a vehicle frame 20. Rear wheels 22 support the frame 20. The bottle 18 will typically have a capacity of about 2,600 to 3,000 gallons, though some bobtails can include a bottle sized up to about 5,000 gallons. The bottle 18 is sufficiently strong to hold propane under pressure in a primarily liquid state, usually with some vapor above the liquid. As known in the art, a rear deck 24 on the bobtail 10 supports various equipment for delivering the propane to the customer's pig (not shown), such as a hose reel 26 and other equipment. For instance, one preferred hose reel 26 is a Hannay electric reel with a 100 foot, 1 inch Gates 20BHB delivery hose.

The self-contained hydraulic pumping arrangement 28 of the present invention is mounted on the bobtail 10 at a preferred location, which is behind the cab 12 on a side of the bottle 18, adjacent a middle section of the bottle 18 and in front of the rear wheels 22 of the bobtail 10. A remote control shut-off mechanism 30 can be mounted above the self-contained hydraulic pumping arrangement 28. The remote control shut-off mechanism 30 may include an antenna 32 and other components (not separately described) as known in the art, and receives wireless signals to effectuate a shut off of the hydraulic pumping arrangement 28. For example, suitable remote control shut-off mechanisms 30 are marketed by Base Engineering, Inc. As will be further explained with reference to FIGS. 2 and 3, two hydraulic lines 34, 36 can be seen running from the rear deck 24 to the self-contained hydraulic pumping arrangement 28, and two product lines 38, 40 can be seen running from the self-contained hydraulic pumping arrangement 28 to a forward side of the bottle 18.

The self-contained hydraulic pumping arrangement 28 includes a housing 42 with a cover 44. An opening 46 through the cover 44 allows for visual inspection of a hydraulic fluid level indicator 48 better shown in FIG. 2. The cover 44 protects the components within the self-contained hydraulic pumping arrangement 28 from weather, flying objects on the road, etc.

Figure 2:
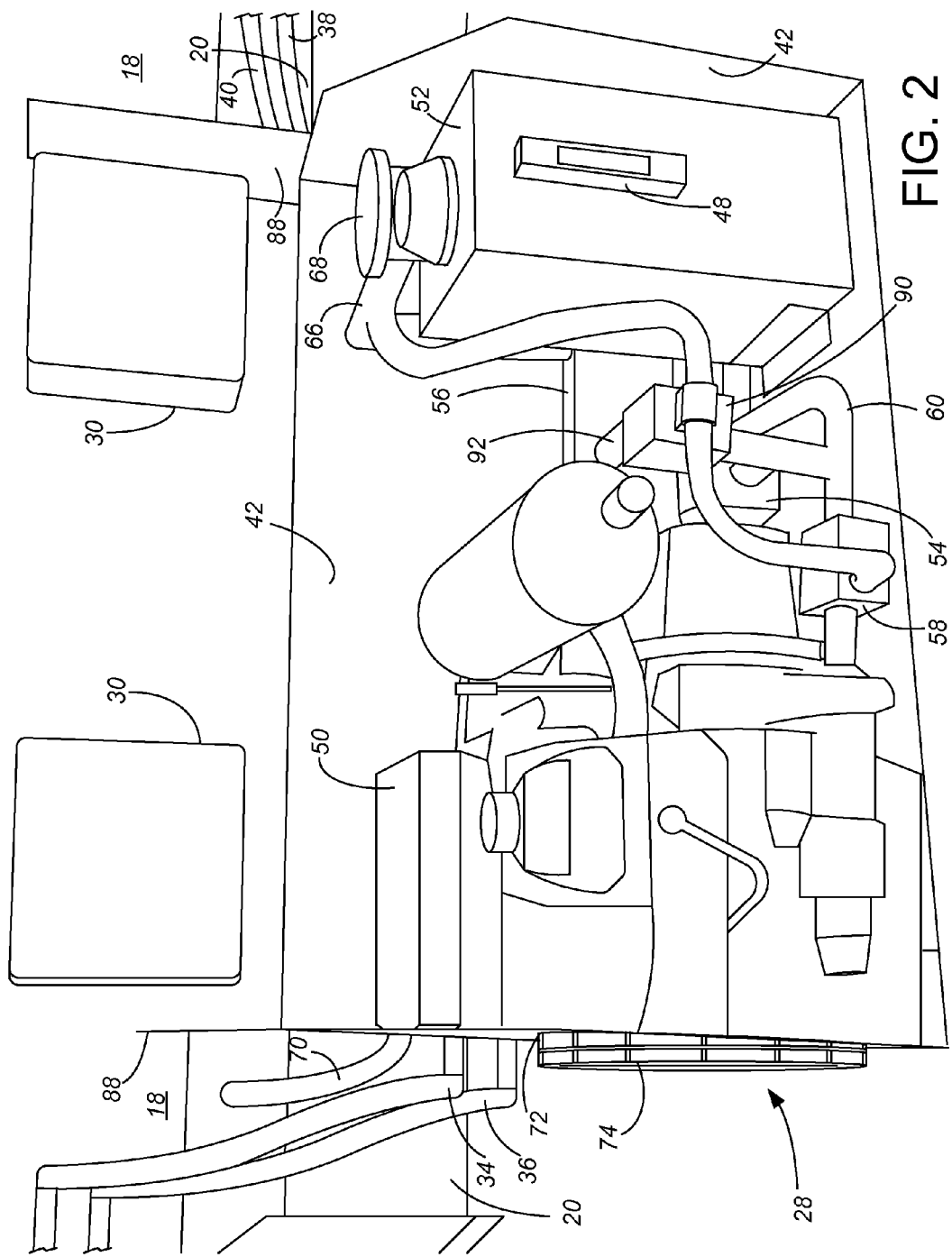
FIG. 2 is a perspective side view of the preferred self-contained truck mountable hydraulic pumping arrangement of FIG. 1 with the housing cover removed.
Figure 3:
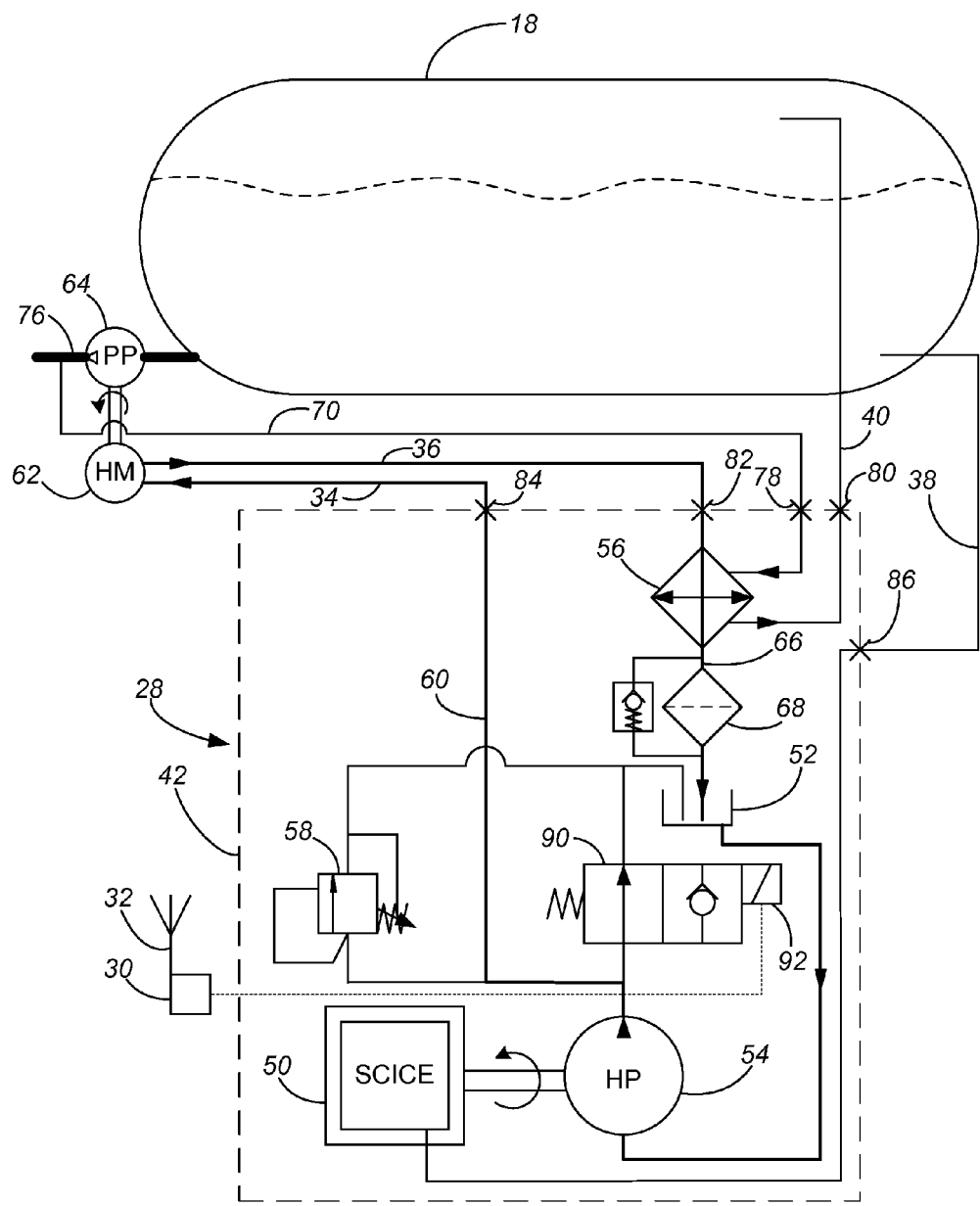
FIG. 3 is a schematic diagram of the preferred embodiment of the present invention.

FIG. 2 shows the self-contained hydraulic pumping arrangement 28 with the cover 44 removed, and FIG. 3 provides a preferred fluid schematic for the bobtail truck 10 including the self-contained hydraulic pumping arrangement 28. The two largest components within the housing 42 are a self-powered engine 50 and a hydraulic fluid tank 52. The self-powered engine 50 runs a hydraulic pump 54, which is preferably mounted on the engine 50 and directly coupled to the output shaft of the engine 50. To make use of the invention described in U.S. Pat. No. 6,732,791, a heat exchanger 56 is also pre-assembled within the housing 42, in the preferred embodiment located partially behind the hydraulic fluid tank 52. A hydraulic relief valve 58 is positioned on the high pressure line 60 from the hydraulic pump 54 to ensure that the pressure of hydraulic fluid delivered to a hydraulic motor 62 (located outside the housing 42 adjacent a product pump 64) remains within specification. A gauge 48 on the hydraulic tank 52 shows the fluid level within the hydraulic tank 52, and may optionally show other information such as a temperature of the hydraulic fluid. The hydraulic return line 66 to the tank 52 may travel through a filter 68, conveniently positioned at the top of the hydraulic fluid tank 52.

The preferred self-powered engine 50 is an internal combustion engine. If desired, the internal combustion engine 50 could work off fuels which are commonly available at service stations for vehicles, such as unleaded gasoline, diesel fuel, ethanol, etc. In the future, the self-contained engine could even be powered by electricity or other alternative energy sources. The preferred engine 50 for a bobtail 10 used in transporting propane is a propane (LPG) engine such as the Kohler Command Pro LPG engine. This engine 50 can either have its own small fuel tank, or more preferably is tapped off the bottle 18. Thus, in the preferred embodiment one of the propane lines 38, 40 leading to the front of the bottle 18 is a fuel intake line 38 for the self contained internal combustion engine 50. Alternatively, the engine 50 could be fed off propane lines 70, 40 on their way to or from the heat exchanger 56, but it is preferred to use an unpressured feed source for propane to feed the variable fuel flow required of the engine 50. Minor modifications to the commercially obtained engine 50, such as moving or eliminating the air filter or muffler to better fit the space within the housing 42, can be easily accomplished as necessary.

As an internal combustion engine, the engine 50 requires air and produces heat. In the preferred embodiment, an opening 72 is provided on the left side wall of the housing 42, and a cage 74 of the self-contained internal combustion engine 50 extends through the opening 72 for direct contact with outside air.

A high pressure line 34 and a return line 36 are run between the hydraulic pump 54 and a hydraulic motor 62 for the product pump 64. In the depicted embodiment, the product pump 64 and its hydraulic motor 62 are above the rear platform 24, but positioning the product pump 64 underneath the bottle 18 is also common. The product pump 64 can be, for instance, a 3 inch Blackmer TLGLF3 propane pump mounted on the rear of the bottle 18. When driven by the hydraulic motor 62, the product pump 64 moves product through a discharge line 76 for delivery to the customer.

When utilizing the invention described in U.S. Pat. No. 6,732,791, a smaller product line 70 is tapped off the discharge line 76 of the product pump 64. This smaller product line 70 transfers a flow of product back to the heat exchanger 56. The propane inlet port 78, propane outlet port 80, and hydraulic return port 82 (all shown only in FIGS. 3 and 4) of the heat exchanger 56, as well as the hydraulic pressure port 84 and the fuel intake port 86, all extend out the bottle-side or back side of the housing 42.

In the preferred embodiment, the smaller product line 70 is positioned within the frame 20 of the vehicle 10 underneath the bottle 18, wherein the normal support arrangement for the bottle 18 defines a protected space. Positioning the product line 70 within this protected space protects the product line 70 during use of the vehicle 10. The hydraulic oil within the hydraulic lines 34, 36 is significantly less flammable than propane, so they can be run outside the frame 20 along the side of the bottle 18.

Importantly, the self-powered engine 50 can be run while the truck's engine is off. In contrast, prior art systems required running the truck engine throughout the entire discharge operation. The hours of stationary engine idling resulted in decreased vehicle life and increased maintenance requirements. As operators look to obtain the best return for their investment in a vehicle such as a bobtail truck 10, cost savings can be achieved without changing the distance traveled by the bobtail fleet simply by reducing the time of stationary engine idling.

By eliminating the power take off ("PTO") of the prior art arrangement in favor of a self-powered engine 50 for the hydraulic pump 54, the self-contained hydraulic pumping arrangement 28 can be preassembled. The self-contained hydraulic pumping arrangement 28 can be easily mounted on the bobtail truck 10 as a single unit, reducing the amount of time that the bobtail truck 10 is out-of-service while having the arrangement 28 installed. There is no need to position the hydraulic pump 54 in the prior art position defined by the PTO, i.e., near the transmission of the vehicle 10. The cost, difficulty and downtime required to install the prior art PTO and hydraulic pump relative to the transmission of the vehicle 10 are eliminated. Without the PTO and without requiring access to the bobtail's transmission, the preassembly 28 can be located on the bobtail truck 10 in a more convenient location for service and monitoring. In the preferred embodiment and as shown in FIG. 1, the preassembly 28 is preferably mounted to the frame 20 of the truck 10 just behind the cab 12. The housing 42 can be directly bolted to the frame 20, and/or flanges 88 can be welded to the bottle 18 to hang the housing 42 off the bottle 18 and thereby use the bottle 18 to mount the housing 42 to the frame 20. By mounting the assembly 28 to the frame 20 of the truck 10 just behind the cab 12, a shorter distance is required for hydraulic lines 34, 36 transmitting power to the product pump 64, and the mounting location is much more convenient and accessible than the transmission-mounted PTO. At the same time, the self-contained assembly 28 is well spaced (for safety reasons, when the product is flammable) from the product discharge location which is typically at the rear of the bottle 18.

Additionally, the preferred assembly 28 includes a solenoid driven start up valve 90, to eliminate back pressure on the hydraulic pump 54 when the self-powered engine 50 is being started. The valve 90 is depicted in this start-up position in FIGS. 3 and 4. After the self-powered engine 50 is started and driving the hydraulic pump 54, the solenoid 92 closes the start up valve 90, directing pressure to the high pressure outlet port 84 and to the hydraulic motor 62 for the product pump 64. The solenoid 92 also provides an easy location to wire in the remote control shut-off mechanism 30, which can open the start up valve 90 (and thereby stop product delivery) when a shut-off signal is received. Alternatively, the remote control shut-off mechanism 30 can be wired to the self-contained internal combustion engine 50.

With the assembly 28 being preassembled, fitting the arrangement 28 to the bobtail truck 10 is relatively simple. The assembly 28 is bolted to the frame 20. Hydraulic lines 34, 36 are plumbed from the hydraulic inlet 82 and outlet 84 on the assembly 28 to the hydraulic motor 62 for the product pump 64. Propane lines 70, 40 are plumbed to and from the ports 78, 80 for the heat exchanger 56. A fuel supply 38 is provided for the self-contained internal combustion engine 50, and the arrangement 28 is ready to go. There is no PTO, no attachment into the transmission, and no hydraulic lines running forward to the location adjacent the transmission.

Accordingly, the arrangement 28 of the present invention is quickly and inexpensively implemented, and significantly reduces run time of the vehicle's engine. Further, the self-powered engine 50 can be more appropriately sized and can provide power more efficiently than the PTO system of the prior art, so energy used in the pumping operation is reduced. Should anything happen to the engine 50, replacing the engine 50 is significantly easier and less costly than replacing either a PTO or a vehicle engine.

Figure 4:
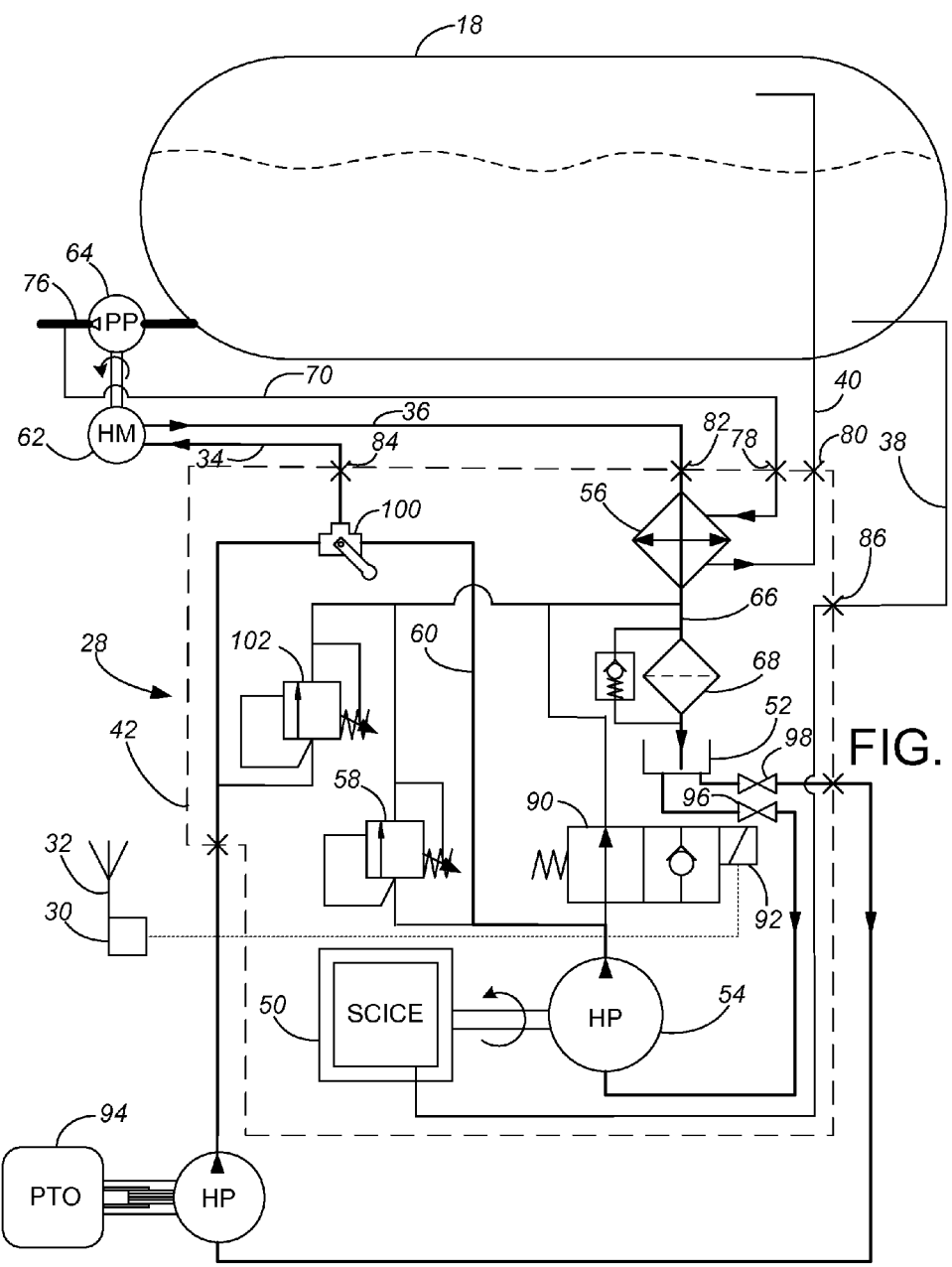
FIG. 4 is a schematic diagram of an alternative embodiment of the present invention.

While eliminating the cost of the PTO is a significant advantage of the present invention, such elimination is not always necessary. FIG. 4 shows an alternative embodiment that retains the PTO 94. Two valves 96, 98 are added off the hydraulic tank 52, as well as a three-way valve 100 on the hydraulic output line 60. The valves 96, 98, 100 enable the operator/driver to select whether to use the PTO 94 or the self-contained internal combustion engine 50 to provide power for the hydraulic lines 34, 36. In this way, the PTO 94 is redundant with the self-contained internal combustion engine 50. The self-contained internal combustion engine 50 can be used for most deliveries to eliminate unnecessary idling of the bobtail's engine. However, in any events such as a problem with starting the self-contained internal combustion engine 50, the PTO 94 can be used as a fall back to ensure that delivery schedules are met. As another example, the self-contained internal combustion engine 50 could be removed for a few days to undergo maintenance or replacement separate from the bobtail 10, using the PTO 94 until the self-contained internal combustion engine 50 is replaced. In the preferred arrangement, a second hydraulic relief valve 102 is added so the pressure of hydraulic fluid delivered to the hydraulic motor 62 from the PTO 94 can be independently controlled, although alternatively by changing the position of the three way valve 100 the single relief valve 58 can be used for both PTO pressure and pressure generated from the self-contained internal combustion engine 50.

Although the present invention has been described with reference to preferred embodiments, workers skilled in the art will recognize that changes may be made in form and detail without departing from the spirit and scope of the invention.

What is claimed is:
1. A hydraulic preassembly comprising:
an internal combustion engine;
a hydraulic pump driven by the internal combustion engine;
a hydraulic outlet port for delivering high pressure hydraulic fluid from the hydraulic pump;
a hydraulic return port for returning hydraulic fluid to the hydraulic pump;
a product inlet port for receiving fluid product;
a heat exchanger receiving hydraulic fluid powered by the hydraulic pump, and exchanging heat from the hydraulic fluid to the fluid product;
a heated product outlet port providing heated fluid product from the heat exchanger; and a mounting arrangement supporting the internal combustion engine, the hydraulic pump and the heat exchanger so they can be jointly attached to a frame of a vehicle and provide connection access to the hydraulic outlet port, the hydraulic return port, the product inlet port and the heated product outlet port.

2. The hydraulic preassembly of claim 1, wherein the hydraulic pump is mounted to the internal combustion engine.

3. The hydraulic preassembly of claim 1, wherein the mounting arrangement comprises a housing which contains the internal combustion engine, the hydraulic pump and the heat exchanger.

4. The hydraulic preassembly of claim 1, further comprising a hydraulic fluid tank connected between the hydraulic return port and the hydraulic pump, the hydraulic fluid tank being jointly attached by the mounting arrangement with the internal combustion engine, the hydraulic pump and the heat exchanger to the frame of the vehicle.

5. The hydraulic preassembly of claim 1, wherein the fluid product is propane, and wherein the internal combustion engine is fueled with propane.

6. A bobtail truck for delivering propane, the bobtail truck comprising:
a vehicle frame supporting a propane bottle;
a product pump for pumping propane out of the propane bottle;
a hydraulic motor driving the product pump;
a vehicle engine for moving the bobtail truck;
a separate internal combustion engine mounted on the vehicle frame;
a hydraulic pump driven by the internal combustion engine, the hydraulic pump providing hydraulic fluid flow connected to power the hydraulic motor; and
a heat exchanger transferring heat from hydraulic fluid driven by the hydraulic pump to propane drawn off the product pump, with the heated propane piped back into the propane bottle;
wherein the separate internal combustion engine, the hydraulic pump and the heat exchanger are jointly mounted on the vehicle frame within an enclosed housing; and
further comprising a hydraulic fluid tank mounted within the enclosed housing; and
further comprising a start-up valve controlled by a solenoid, the start-up valve relieving back pressure on the hydraulic pump during starting of the separate internal combustion engine, the start up valve mounted within the enclosed housing.

7. The bobtail truck of claim 6, wherein the enclosed housing is mounted on a side of the bobtail truck adjacent the bottle and in front of a rear wheel.

8. The bobtail truck of claim 6, further comprising a filter on a return line to the hydraulic tank, the filter mounted within the enclosed housing.

9. The bobtail truck of claim 6, wherein the enclosed housing includes an opening for viewing a hydraulic fluid level gauge for the hydraulic tank.

10. The bobtail truck of claim 6, wherein the enclosed housing includes a cage opening, with a cage of the separate internal combustion engine extending through the cage opening to draw air for combustion.

11. The bobtail truck of claim 6, further comprising a remote control shut-off receiving wireless signals which can effectuate a shut off of product delivery.

12. The bobtail truck of claim 6, wherein the separate internal combustion engine is fueled by propane.

13. A bobtail truck for delivering propane, the bobtail truck comprising:
a vehicle frame supporting a propane bottle;
a product pump for pumping propane out of the propane bottle;
a hydraulic motor driving the product pump;
a vehicle engine for moving the bobtail truck;
a separate internal combustion engine mounted on the vehicle frame, wherein the separate internal combustion engine is fueled by propane;
a fuel line drawing propane from the bottle to the separate internal combustion engine; and
a hydraulic pump driven by the separate internal combustion engine, the hydraulic pump providing hydraulic fluid flow connected to power the hydraulic motor.

14. A method of outfitting a bobtail truck for delivery of propane, the bobtail truck having a frame supporting a bottle, the method comprising:
preassembling a hydraulic preassembly comprising:
an internal combustion engine;
a hydraulic pump driven by the internal combustion engine;
a hydraulic outlet port for delivering high pressure hydraulic fluid from the hydraulic pump;
a hydraulic return port for returning hydraulic fluid to the hydraulic pump;
a heat exchanger receiving hydraulic fluid powered by the hydraulic pump; and
a mounting arrangement supporting the internal combustion engine, the heat exchanger and the hydraulic pump;
attaching the mounting arrangement of the hydraulic preassembly to the frame of the bobtail truck;
connecting hydraulic lines from the hydraulic outlet port to a hydraulic motor for a product pump mounted on the bobtail truck and from the hydraulic motor to the hydraulic return port; and
running a product line from an output of the product pump to the heat exchanger and a discharge product line from the heat exchanger to the bottle, so product is drawn from the product pump to cool hydraulic fluid in the heat exchanger, with the heated product returned to the bottle.

15. The method of claim 14, wherein the mounting arrangement comprises an enclosed housing containing the internal combustion engine, the heat exchanger and the hydraulic pump; and wherein the attaching act comprises mounting the enclosed housing on a side of the bobtail truck adjacent the bottle and in front of a rear wheel.

16. The method of claim 15,
wherein the product pump is mounted above a rear platform at a rear of the bottle;
wherein the frame of the bobtail truck defines a protected space within the frame of the bobtail truck and generally underneath the bottle; and
wherein the product line is positioned within the protected space.

17. A bobtail truck for delivering propane, the bobtail truck comprising:
a vehicle frame supporting a propane bottle;
a product pump for pumping propane out of the propane bottle;
a hydraulic motor driving the product pump;
a vehicle engine for moving the bobtail truck;
a separate internal combustion engine mounted on the vehicle frame;

a hydraulic pump driven by the internal combustion engine, the hydraulic pump providing hydraulic fluid flow connected to power the hydraulic motor; and a start-up valve controlled by a solenoid, the start-up valve relieving back pressure on the hydraulic pump during starting of the separate internal combustion engine.

* * * * *